May 20, 1930.   G. B. CROUSE   1,759,545
ELIMINATING EFFECT OF VARIATIONS IN CURRENT SUPPLIED TO AUDIONS
Filed Aug. 22, 1924   6 Sheets-Sheet 1

INVENTOR
George B. Crouse,
BY
Walter J. Gill
ATTORNEY

May 20, 1930.　　　　G. B. CROUSE　　　　1,759,545
ELIMINATING EFFECT OF VARIATIONS IN CURRENT SUPPLIED TO AUDIONS
Filed Aug. 22, 1924　　6 Sheets-Sheet 3

Fig. 6

INVENTOR
George B. Crouse
BY Walter J. Gill
ATTORNEY

Fig 8

May 20, 1930. G. B. CROUSE 1,759,545
ELIMINATING EFFECT OF VARIATIONS IN CURRENT SUPPLIED TO AUDIONS
Filed Aug. 22, 1924 6 Sheets-Sheet 6

Fig.9

INVENTOR
George B. Crouse
BY Walter J. Gill
ATTORNEY

Patented May 20, 1930

1,759,545

UNITED STATES PATENT OFFICE

GEORGE B. CROUSE, OF WOODCLIFF, NEW JERSEY, ASSIGNOR, BY MESNE ASSIGN-MENTS, TO CONNER CROUSE CORPORATION

ELIMINATING EFFECT OF VARIATIONS IN CURRENT SUPPLIED TO AUDIONS

Application filed August 22, 1924. Serial No. 733,558.

The invention relates to eliminating in the output circuit of an audion the effects of variations in current supplied to its elements.

Recognizing the desirability and advantages of being able to supply the audions of a radio receiver directly from lighting circuits without the use of batteries many inventors have obtained patents for arrangements intended to accomplish this purpose, but for one reason or another none of the patented arrangements with which I am familiar provides a current supply which is absolutely free from all alternating current components or short period variations, such as is required for the satisfactory operation of audions, particularly when used as detectors and as amplifiers in radio receivers. It is therefore the usual practice to supply the current for the audions of radio receivers from primary or secondary batteries, but their disadvantages are many and well known, particularly to those who have had occasion to use them.

In my co-pending application Serial No. 680,096, filed December 12, 1923, there is disclosed a method of filtering electric currents to provide a direct current supply for audions which is free from short period variations, such as occur when alternating current is rectified or when direct current is generated by a dynamo having a commutator. This is accomplished by causing the current to be filtered to flow in parallel paths and connecting the load circuit across these paths at points of substantially equal alternating current potential but of unequal direct current potential, in the manner of a Wheatstone bridge having inductances in its four arms and condensers in two opposite arms, the bridge being balanced for alternating currents or short period variations. The invention therefore makes possible the use of even rectified alternating current for supplying the cathodes and plates of audions.

It is an object of the present invention to eliminate in the output circuit of an audion the effects of variations in current supplied to its elements, so that filters which fail to give current of the requisite smoothness may be used, or if the improved and satisfactory filter of my copending application be used it may be made smaller. In other words, the invention makes possible the use for the cathodes and plates of audions of current which contains a percentage of short period variations or ripples, as they are usually called, whereas it has previously been necessary to use current absolutely free from such variations or ripples.

This object as well as others which will hereinafter appear are attained by applying to one element of an audion variations in potential to oppose the effect on the output circuit caused by variations in the current supplied to this element and another element. The invention may be practiced in several ways. For instance, variations in potential may be applied to the plate to oppose the effect on the output circuit caused by variations in the plate circuit due to variations in the current supplied to the cathode. This may be done by placing in the plate circuit inductance and capacity so selected as to be anti-resonant at the frequency of the alternating component of the supply.

Another way of practicing the invention is to increase the cathode effect by by-passing a resistance in series with the cathode by a condenser, the by-pass circuit being made resonant at the frequency of the supply ripple by an inductance in order that there shall be no phase shift between the cathode and plate effect.

A third way is to increase the cathode effect sufficiently to cancel the plate effect of the supply ripple by applying to the grid an additional alternating potential.

The invention is also applicable to those arrangements in which the cathodes of the audions are supplied with alternating current, but which are not free from disturbances because the grid voltage-plate current characteristic is not a straight line in actual tubes.

The particular nature of the invention will appear most clearly from a description of certain preferred embodiments and their applications to radio receivers as shown in the accompanying drawings in which—

For convenience the general principles of the invention will first be explained in connection with simplified diagrams, after which various applications of the invention to radio receivers will be described.

Figure 1:
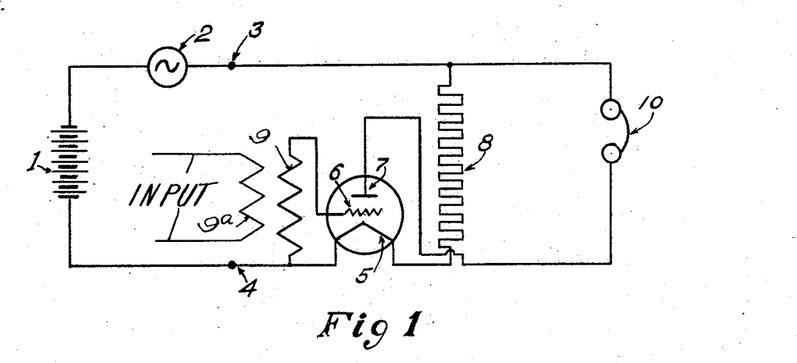
Fig. 1 is an electrical diagram of an illustrative character for use in explaining the invention.
Figure 2:
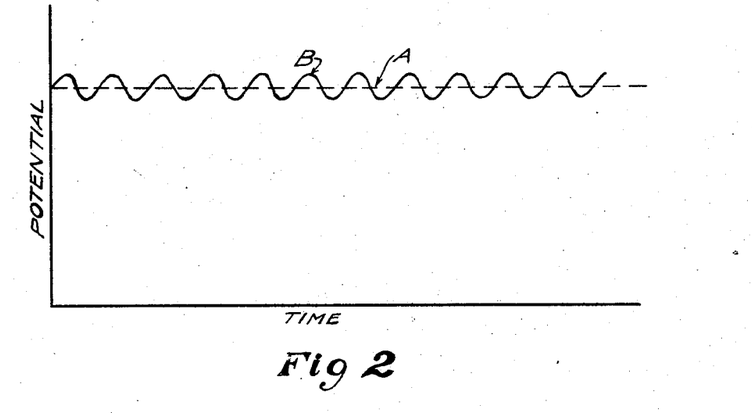
Fig. 2 shows the potential characteristics of the current supplied to the circuits of Fig. 1.

For the purpose of illustrating a current supply containing ripples or short period variations there is shown in Fig. 1 a battery 1 of suitable voltage for operating the plate circuit of an audion and in series with which is an alternating current generator 2. The potential supplied at the terminals 3 and 4 will therefore have the characteristics shown in Fig. 2 and consisting of a direct current component represented by the straight broken line A and an alternating current component represented by the wavy line B, which is the ripple effect which it is the object of this invention to eliminate.

5 is the filament, 6 the grid and 7 the plate of an audion. The filament is connected to the terminals 3 and 4 through a resistance 8 of such magnitude as to reduce the potential across the filament to a suitable value. The secondary 9 of a suitable input transformer is connected in the usual way with one end to the grid 6 and the other end to the negative end of the filament 5. The primary of this transformer is shown at 9ª. The plate 7 is connected to the positive terminal 3 through a device 10 which is shown as a telephone receiver, but it may be the primary of a repeater for connecting the circuit to a second audion.

Since the potential applied to the terminals 3 and 4 has an alternating current component, (B, Fig. 2) the current passing through the filament will also have an alternating current component, which will be in phase with the potential, since the filament circuit is entirely resistive. The alternating potential across the filament itself, which will only be a small fraction of that across the terminals 3 and 4 since a large part of it is dissipated across the resistance 8 will cause a voltage to be applied to the grid in phase with the drop, since the grid is connected to one end of the filament. A variation of the plate current of the audion will therefore occur, which will be an exact reproduction (neglecting the small distortion effects of the audion) of the alternating potential across the filament, but will be 180° out of phase with it. The alternating potential at the terminals 3 and 4 is applied directly to the plate circuit and will cause a variation in the plate current which is in phase with the potential, except for the phase shift caused by the inductive device 10.

The effect of the filament variations on the plate current due to the action of the grid, will generally be smaller than the direct effect of the variations applied to the plate, as may be seen by applying some usual values to the quantities. Let $Ef$ = filament voltage drop, D. C. = 5 volts
$Rf$ = filament resistance = 20 ohms
$Ep$ = plate voltage, D. C. = 100 volts
$Xp$ = plate impedance = 20,000 ohms
$Xo$ = impedance of device 10, at frequency of ripple = 20,000 ohms
$u$ = amplifying constant of audion = 9
$R8$ = resistance of 8 = 380 ohms
$Eb$ = value of alternating current potential at terminals 3 and 4 = 1 volt The alternating current potential across the filament, $Ebf$, will be given by the formula:

$$Eb\left(\frac{Rf}{Rf+R8}\right)$$

Since approximately only half of this potential is effectively applied to the grid, the effect on the output or plate circuit is equivalent to a voltage on the plate of $$\frac{1}{2}Eb\frac{Rf}{Rf+R8}u$$

(see Van der Bijl, "Thermionic Vacuum Tubes", page 150 et seq.)

By substituting the numerical values given above in this equation, there is obtained a value of the plate voltage fluctuation due to the filament effect of 0.225 volts, whereas, as stated previously, an alternating potential of 1 volt is applied directly to the plate, but in opposite phase to the filament effect.

Figure 3:
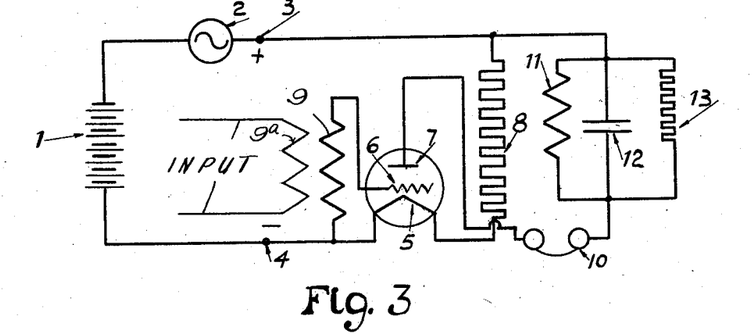
Fig. 3 is an electrical diagram similar to that of Fig. 1, but with additional elements in accordance with one embodiment of the invention.

In order that there shall be no alternating current component in the output, the alternating potential applied directly to the plate must be made equal to the plate voltage variations due to the filament effect, that is, to 0.225 volts for the electrical constants given above. This may be done in several ways. One means of conveniently accomplishing it is shown in Fig. 3 which is similar to Fig. 1, (as far as elements 1 to 10 inclusive are concerned,) but an inductance 11, a capacity 12 and a resistance 13 are added to the plate circuit. The relative values of the capacity and inductance are such as to make the combination anti-resonant at the frequency of the alternating component of the supply. This combination, if properly designed as to internal losses, will reduce the alternating component of the plate supply to a value considerably below the value of the plate voltage fluctuations due to the filament effect without shifting its phase. The value can then be increased by the resistance 13 to that necessary to give zero alternating current in the output of the tube. When this adjustment is properly made, the plate circuit of the audion has an effective impedance of infinity for the frequency of the supply ripple, and therefore there is no phase shift effect due to the inductive device 10. Since in practice, the frequency of the supply ripple is usually low, the condenser 12 serves as a by-pass for the higher useful signal frequencies and prevents intercoupling at these frequencies.

Figure 4:
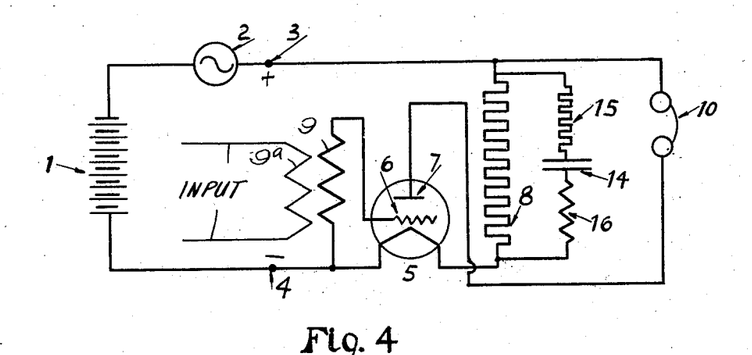
Fig. 4 is a similar diagram in accordance with another embodiment of the invention.

Another arrangement by which the invention may be practiced is shown in Fig. 4, in which the parts identical with those of Fig. 1 are identically numbered. In this case, the resistance 8 in series with the filament is by-passed by means of the condenser 14. The effect of this capacity is to increase the filament effect, instead of, as in the case of Fig. 3, reducing the plate effect. In order that there shall be no phase shift between the filament and plate effects, this capacity by-pass circuit is made resonant at the frequency of the supply ripple, by means of the inductance 16. The amount of current by-passed is adjusted by means of the resistance 15.

Still another way in which the invention may be practiced is shown in Fig. 5, in which again the parts identical with those of Fig. 1 are similarly numbered. In this arrangement the filament effect is increased sufficiently to cancel the plate effect of the supply ripple by applying to the grid an additional alternating potential, by means of the coil 17 placed in series with the filament lead and inductively related to the input coil 9 in the grid circuit. The bracket in this figure indicates that the primary coil 9ᵃ of the transformer is also inductively related to the secondary coil 9.

Figure 5:
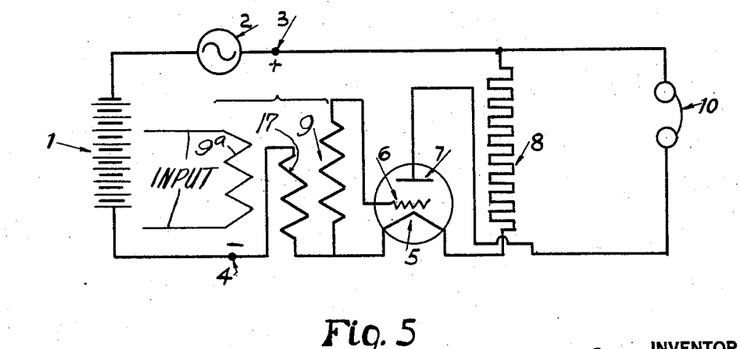
Fig. 5 is a similar diagram in accordance with a third embodiment of the invention.

The above explanation in connection with Figs. 3, 4 and 5 shows three ways in which the invention may be practiced, in the first of which the balance is obtained by reducing the plate circuit ripple, in the second, by increasing the alternating potential drop across the filament and in the third, by increasing the filament effect by means of the grid. It should be understood that in the numerical example given and in the embodiments shown, values have been taken for the quantities, which are usual for small tubes. In the case of tubes having a high amplification constant, or having a high filament resistance, and a low value direct current plate potential, so that the filament effect will normally be greater than the plate effect, modifications of the arrangements shown will readily suggest themselves to those skilled in the art to which the invention relates.

Figure 6:
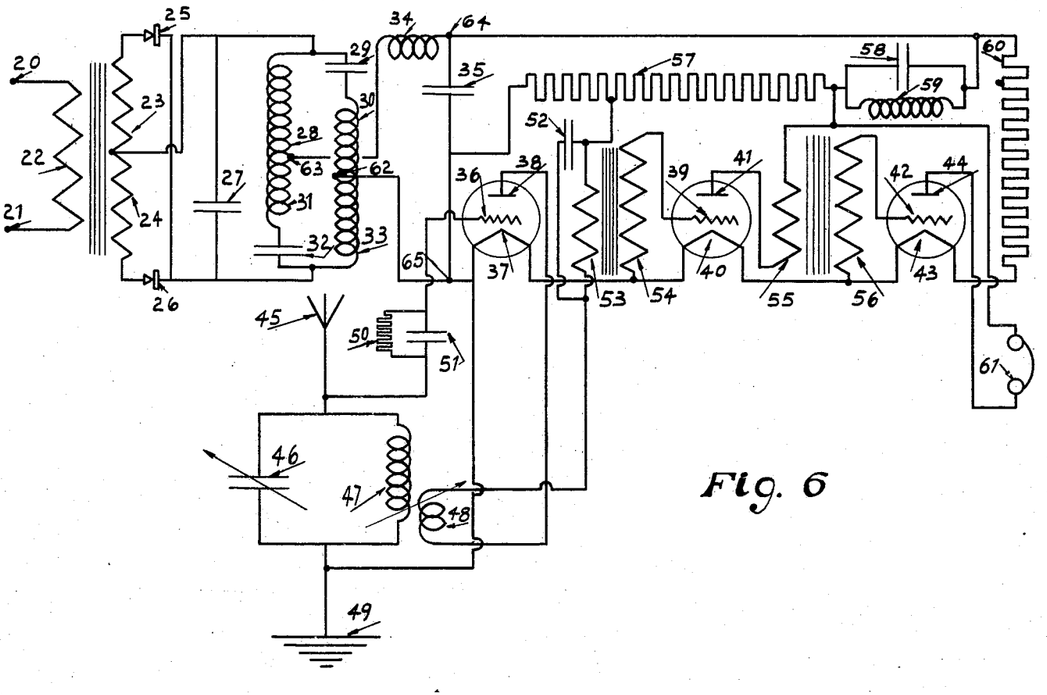
Fig. 6 is an electrical diagram showing an application of the embodiment of the invention disclosed in Fig. 3 to a typical radio receiver.

The general principles of the invention having been explained, its application to the energization of the audions of radio receivers or the like will now be described. In Fig. 6 there is shown a common type of radio receiver in which the current for both filaments and plates of the audions is supplied from an alternating current source, rectified and then filtered in accordance with the invention of the copending application hereinbefore referred to. In this figure 20 and 21 are the terminals of an alternating current supply of usual commerical frequency and voltage. Current from this source passages through the primary 22 of a transformer which has two secondary windings 23 and 24 connected in the usual manner to the rectifiers 25 and 26, this arrangement being a common one for rectifying both halves of the alternating current cycle. The rectified current is then supplied to the storing condenser 27. To the terminals of this condenser is connected a bridge circuit, comprising the inductances 28, 30, 31 and 33 and the capacities 29 and 32, the action of which is fully described in the said copending application. The filtered direct current is taken off at the two mid connections 62 and 63, and passed through an inductance 34. Across the terminals 64 and 65 of the receiver is connected a capacity 35.

Starting from the terminal 64, the circuit is divided, one branch passing through a reducing resistance 60 and the three audion filaments 37, 40 and 43 and thence to the terminal 65. The other branch comprises the anti-resonant circuit having the capacity 58 and inductance 59 in parallel and the potentiometer resistance 57. From the potentiometer are taken off the plate circuits of the three audions, the circuit of the first, or detector audion, comprising the plate 38, the "tickler" or feed-back coil 48 and the primary 53 of an audio-frequency transformer for repeating into the next audion through its secondary 54. The plate circuit of the first amplifier tube comprises the plate 41 and the primary 55 of a repeating transformer having a secondary 56 for the second amplifier, the plate circuit of which comprises the plate 44 and the telephone receiver 61.

The antenna 45 has the usual tuned circuit composed of the variable condenser 46, the inductance 47 and the ground connection 49. An inductive relation exists between the tuning coil 47 and the feed-back coil 48. A condenser 52 is connected around the primary 53 of the first repeating device, in order to by-pass the radio frequency component of the detected signal. 50 is a grid leak and 51 a grid condenser for the detector audion.

The action of the circuit is as follows. The alternating current supplied at the terminals 20 and 21 is first rectified by means of the rectifiers 25 and 26 and is then smoothed out or filtered by the apparatus shown connected between the rectifiers and the terminals 64 and 65, which operates as described in the said copending application. At these latter terminals, the potential consists of a direct current component and small alternating current components of various frequencies, the lowest of which is usually twice the frequency of the supply. Frequencies higher than this are present in only minute quantities, due to the greater efficiency of the filter at higher frequencies. This fundamental frequency is therefore the only one which is ordinarily required to be balanced out by the method of this invention. This balancing is accomplished by a suitable reduction of the component of the ripple voltage across the plate terminals, by means of the anti-resonant circuit 58 and 59, which is anti-resonant at twice the frequency of the supply. This application of the invention therefore corresponds to that shown in a simplified manner in Fig. 3. Instead of employing the additional resistance 13 of Fig. 3, to properly adjust the value of the plate potential, this resistance is incorporated directly into the inductance 59, in Fig. 6.

Figure 7:
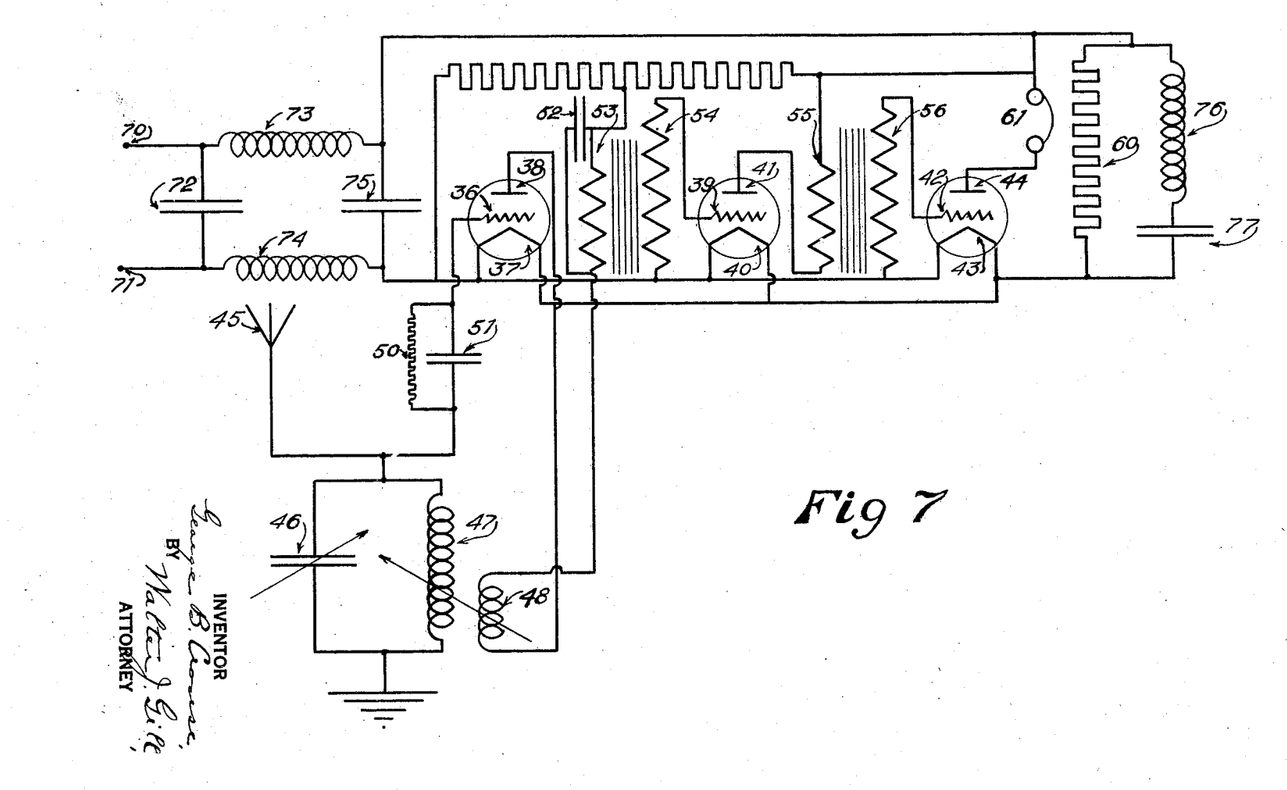
Fig. 7 is a similar diagram showing an application to a radio receiver of the embodiment disclosed in Fig. 4.

In Fig. 7 the embodiment of the invention previously described in connection with Fig. 4 is shown applied to a radio receiver for which the power is derived from direct current mains. In this figure 70 and 71 are the terminals of a commercial direct current lighting system. The filter comprising the condenser 72, the inductances 73 and 74 and the second condenser 75 is of a well known form. From this point on the receiver circuit is the same as that shown in Fig. 6, with elements similarly numbered, with the exception that the filaments of the audions 37, 40 and 43 are connected in parallel and the balancing means is in parallel around the resistance 60, instead of in series with the plate circuit as in the previous figure. The balancing means comprises the inductance 76 and the capacity 77, the resistance 15 of Fig. 4 being directly incorporated in the inductance 76. This circuit will ordinarily be made resonant at the frequency of the commutator ripple present in the direct current supply. The action of this resonant circuit has been fully explained in connection with Fig. 4.

Figure 8:
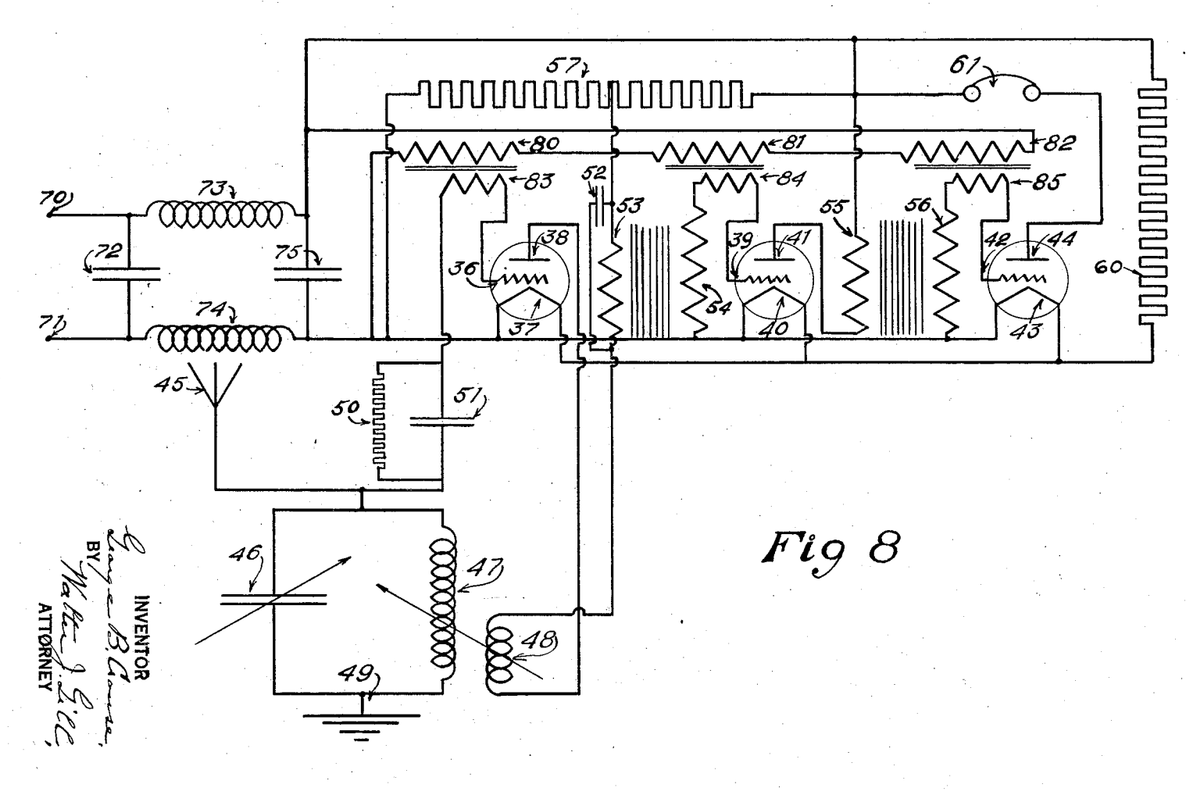
Fig. 8 is a similar diagram showing a similar application of the embodiment disclosed in Fig. 5.

In Fig. 8 the embodiment of the invention previously described in connection with Fig. 5 is shown as applied to a circuit otherwise identical with Fig. 7 and having like parts similarly numbered. In Fig. 8 the compensation is effected by means of transformers which apply an alternating potential to the grids of the audions in proper phase and amount to offset the potential applied to the plates. In the circuits of the grids 36, 39 and 42 of the audions are connected respectively the secondaries 83, 84 and 85 of transformers, the primaries 80, 81 and 82 of which are connected in series directly across the output terminals of the filter. The direct current resistance of these windings is sufficiently high so that no appreciable direct current is drawn in comparison with the useful direct current load. Separate transformers are used for each tube to prevent intercoupling between tubes and consequent howling of the system.

In the applications of the invention described above both the filaments and plates of the audions are supplied with rectified and filtered alternating current or filtered direct current, but the invention may also be employed in connection with radio receivers having the filaments of the audions supplied with alternating current and the grids of the audions connected to the mid-points of the potentiometers connected across the filaments in the manner and for the purpose disclosed in United States Patents, No. 1,432,022 to Heising, October 17, 1922, and No. 1,195,632, to White, August 22, 1916. This mid-point connection does not however eliminate disturbances in the plate circuit due to the alternating current supplied to the filament, because the grid voltage-plate current characteristic is not a straight line in actual tubes. As may be shown both mathematically and experimentally the result of curvature of the characteristic is to cause a ripple in the output circuit the lowest frequency of which is twice the frequency of the current supplied to the filament. It has been found by experiment that the ripple is largely composed of this second harmonic component, the higher harmonics being comparatively small in amplitude.

Figure 9:
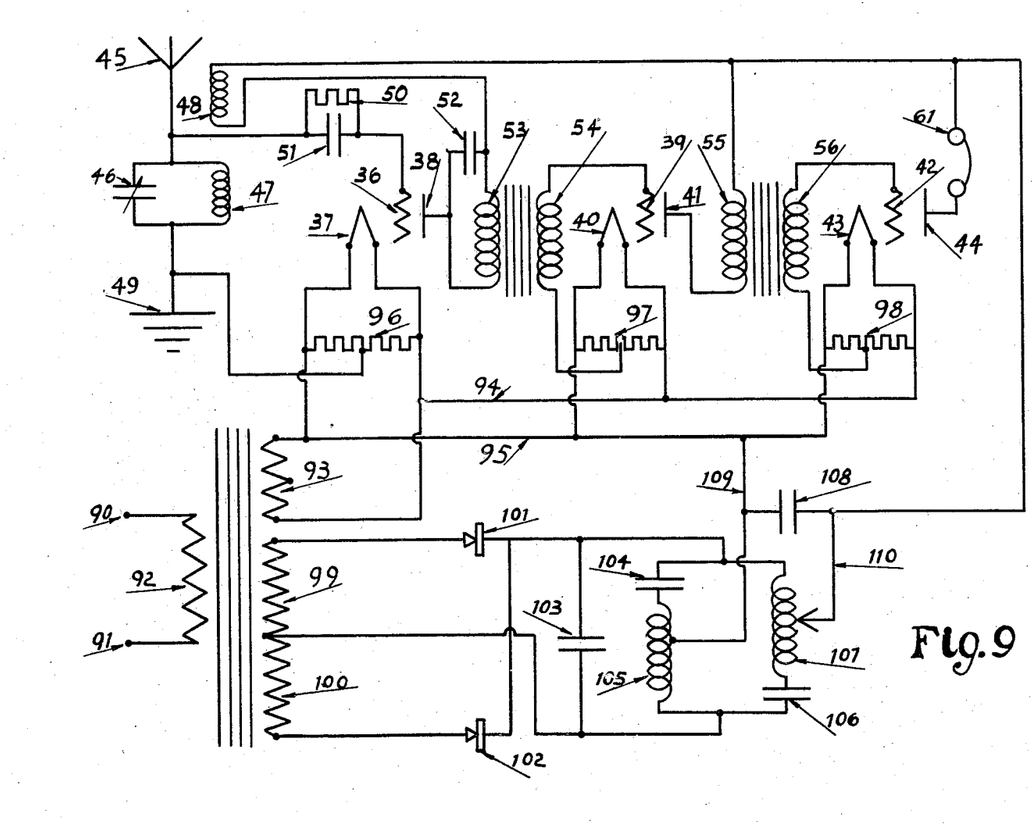
Fig. 9 is an electrical diagram showing the invention applied to a radio receiver in which the filaments of the audions are energized by alternating current.

In Fig. 9 there is shown an application of the invention to a radio receiver of the type shown in Figs. 6, 7 and 8 and having elements corresponding to those of the former figures similarly numbered. 90 and 91 are the terminals of a commercial alternating current supply, to which is connected the primary 92 of a transformer. The secondary 93 of the transformer supplies alternating current at a suitable voltage for the filaments of the audions to the filament bus wires 94 and 95. The filaments 37, 40 and 43 are connected in parallel across the bus wires. Potentiometers 96, 97 and 98 are connected across the filaments, and the grids 36, 39 and 42 are connected to the mid-points of these potentiometers in the manner described in the above referred to Heising Patent No. 1,432,022.

Secondaries 99 and 100 of the transformer are wound on the same core as the primary 92 and are connected in series with each other. These secondaries supply alternating current at suitable voltage for the plates after the losses in the rectifiers and filter have been deducted. Rectifiers 101 and 102 are arranged as shown for rectifying both halves of the alternating current wave. A storing condenser 103 is connected across the output terminals of the rectifier. The filter consisting of condensers 104 and 106 and inductances 105 and 107 is like that disclosed in copending application Serial No. 680,096 referred to above, these elements being arranged to form a bridge to the balance points of which are connected conductors 109 and 110 having between them a condenser 108 of suitable value to by-pass the useful audio frequency current in the plate circuits. Conductor 110 may be connected to inductance 107 at different points in accordance with the magnitude of the ripple effect which should be applied to the plate circuits.

As explained above the grid connections to the mid-points of the potentiometers do not eliminate disturbances in the plate circuits, as would be the case if the grid voltage-plate current characteristic were a straight line. It has been found that the ripple effect which is present in the conductors 109 and 110 when the bridge consisting of condensers 104 and 106 and inductances 105 and 107 is slightly unbalanced is principally of twice the frequency of the alternating current supply. Since the amount of ripple effect in the plate circuits may be controlled by the variable point of connection of conductor 110 to inductance 107, the effect may be used to offset the disturbance in the plate circuits caused by the alternating current in the filaments even with the mid-point connections of the grids. There is thus obtained an output which is free from ripple effect.

While certain preferred embodiments of the invention have been disclosed and applications of them to typical radio receivers have been shown, it will be understood that the invention may be embodied in other forms and applied to other types of radio receivers without departing from the principle thereof as defined in the appended claims.

I claim:

1. The method of counteracting in the plate circuit of an audion the effects of alternating components of audible frequency in the plate-energizing source which comprises impressing across the cathode-heating circuit an alternating voltage derived from said source and of a phase and magnitude to cause variations in the plate circuit substantially equal and opposite to those variations due to the fluctuating current supplied to the plate.

2. The method of eliminating in the plate circuit of an audion the effect of audio frequency variations in potential of the current energizing the plate and cathode, which comprises supplying the cathode-heating circuit with current having audio frequency potential variations of a magnitude substantially greater than the potential variations of the current supplied to the plate, thereby to cause variations in the plate circuit substantially equal to those of the current supplied directly to the plate while preventing shifting of the phase relation between the cathode and plate effects.

3. The method of counteracting in the plate circuit of an audion the effect of alternating components of audible frequency in a single source of supply which energizes the plate and cathode, which comprises balancing the alternations produced in the plate circuit by the alternating components in the cathode-heating circuit against substantially equal and opposite alternations in the potential applied to the plate circuit.

4. The method of operating an audion whose plate is energized from a source of direct current having alternating components of audible frequency, which comprises impressing across the cathode-heating of said audion an alternating voltage derived from said source and in phase and magnitude effective to produce in the plate circuit variations in voltage substantially equal and opposite to those of the directly-applied plate-energizing current.

5. The method of energizing an audion which consists in energizing its plate and cathode with direct current containing alternating components and eliminating the effect in the plate circuit of said alternating components by increasing the magnitude of the alternating components in the current supplied to the cathode to cause variations in voltage of the current in the plate circuit substantially equal to the alternating components in the current supplied directly to the plate while preventing shifting of the phase relation between the cathode and plate effects.

6. Apparatus for energizing an audion, comprising a plate current supply derived from a source of current having alternating components of audible frequency, and means for impressing across the cathode-heating circuit an alternating voltage derived from said source, the impedance of said means being such that the phase and magnitude of the applied voltage produces a neutralization in the plate circuit of the effects of the alternating components of the plate supply.

7. In apparatus for eliminating in the plate circuit of an audion the effect of variations in potential of the current supplied to the plate and cathode, means for increasing the magnitude of the variations in potential of the current energizing said cathode to cause variations in the plate circuit substantially equal to those of the current supplied directly to the plate and for preventing shifting of the phase relation between the cathode and plate effects.

8. In apparatus for eliminating in the plate circuit of an audion the effect of variations in potential of the current supplied to the plate and cathode, a resistance in series with the cathode and a by-pass circuit around the resistance composed of a capacity and an inductance and resonant at the frequency of said variations.

9. The combination with apparatus for energizing the plate of an audion from a source of direct current having alternating components of audible frequency, of means for passing through the cathode-heating circuit an alternating current derived from said source through said apparatus, the impedance of said means being such that the phase and magnitude of the alternating current counteracts the effect in the plate circuit of the alternating components of the plate current supply.

10. In apparatus for energizing an audion, means for supplying its plate and cathode with direct current containing alternating components and means for increasing the magnitude of the alternating components in the current supplied to the cathode to cause variations in voltage of the current in the plate circuit substantially equal to the alternating components in the current supplied directly to the plate and for preventing shifting of the phase relation between the cathode and plate effects.

11. In apparatus for energizing the cathode and plate circuits of an audion from a source of direct current containing periodic alternating components of audible frequency, the combination of means defining direct current paths for impressing upon the said audion elements from said source the direct current potentials required for operation of the audion, of alternating circuit impedance in the cathode-heating current path for altering the ratio of the alternating to direct components in the current supply to said cathode to render negligible the effect of alternating components in the current supply to the plate through the other direct current path.

In testimony whereof I affix my signature.
GEORGE B. CROUSE.